United States Patent
Sakaguchi et al.

(10) Patent No.: US 6,612,133 B2
(45) Date of Patent: Sep. 2, 2003

(54) METHOD FOR SHIFTING ABSORPTION PEAK WAVELENGTH OF INFRARED RADIATION ABSORBING GLASS

(75) Inventors: Koichi Sakaguchi, Osaka (JP); Hiromitsu Seto, Osaka (JP); Yukihito Nagashima, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 306 days.

(21) Appl. No.: 09/792,585

(22) Filed: Feb. 26, 2001

(65) Prior Publication Data

US 2001/0021685 A1 Sep. 13, 2001

Related U.S. Application Data

(63) Continuation-in-part of application No. 08/864,984, filed on May 29, 1997, now abandoned.

(30) Foreign Application Priority Data

Jun. 7, 1996 (JP) .............................. 8-145280

(51) Int. Cl.[7] .......................... C03C 15/00; C03B 32/00
(52) U.S. Cl. .......................... 65/30.1; 65/33.2; 65/111; 501/69; 501/70; 501/71; 501/64; 501/904
(58) Field of Search ............................... 65/33.2, 30.1, 65/111; 501/904, 69, 70, 71, 64

(56) References Cited

U.S. PATENT DOCUMENTS

| | | |
|---|---|---|
| 3,723,142 A | 3/1973 | Kato et al. |
| 3,779,733 A | 12/1973 | Janakirama-Rao |
| 4,101,705 A | 7/1978 | Fischer et al. .................. 501/71 |
| 4,104,076 A | 8/1978 | Pons ........................... 501/71 |
| 4,701,425 A | 10/1987 | Baker et al. |
| 4,866,010 A | 9/1989 | Boulos et al. ................. 501/71 |
| 5,036,025 A | 7/1991 | Lin .............................. 501/48 |
| 5,264,400 A | 11/1993 | Nakaguchi et al. ............ 501/71 |
| 5,318,931 A | 6/1994 | Nakaguchi et al. ............ 501/64 |
| 5,344,798 A | 9/1994 | Morimoto et al. |
| 5,364,820 A | 11/1994 | Morimoto et al. ............. 501/71 |
| 5,372,977 A | 12/1994 | Mazon-Ramos et al. ...... 501/57 |
| 5,380,685 A | 1/1995 | Morimoto et al. ............. 501/71 |
| 5,385,872 A | 1/1995 | Gulotta et al. ................. 501/71 |
| 5,411,922 A | 5/1995 | Jones |
| 5,521,128 A | 5/1996 | Jones et al. |
| 5,723,390 A | 3/1998 | Kijima et al. .................. 501/70 |
| 5,763,342 A | 6/1998 | Mita et al. ..................... 501/64 |
| 5,776,845 A | 7/1998 | Boulos et al. ................. 501/70 |
| 5,897,956 A | 4/1999 | Kijima et al. .................. 501/64 |

FOREIGN PATENT DOCUMENTS

| | | |
|---|---|---|
| DE | 4313215 | 10/1993 |
| EP | 0561337 A | 9/1993 |
| EP | 0561337 | 9/1993 |
| EP | 0565882 A | 10/1993 |
| EP | 0 598 305 A1 | 11/1993 |
| EP | 0604314 A | 6/1994 |
| EP | 0677492 A | 10/1995 |
| EP | 0709344 A | 5/1996 |
| EP | 0748776 A | 12/1996 |
| EP | 0653387 | 5/1997 |
| EP | 0 811 581 A1 | 12/1997 |
| JP | 2-96623 | 4/1990 |
| JP | 4-310539 | 11/1992 |
| JP | 406092678 A | 4/1994 |
| JP | 6345482 | 12/1994 |
| JP | 6345483 | 12/1994 |
| JP | A-9-328332 | 12/1997 |

*Primary Examiner*—Michael Colaianni
(74) *Attorney, Agent, or Firm*—Sughrue Mion, PLLC

(57) ABSTRACT

A method for shifting the absorption peak wavelength in the wavelength range 900–1600 nm of an infrared radiation absorbing glass from less than 1100 nm to 1100 nm or longer without substantially changing the tint of the glass, comprising the step of irradiating with ultraviolet light of 400 nm or shorter at an energy density of $1.0 \times 10^6$ J/m$^2$/hr or more to increase the content of FeO in the irradiated glass by reducing Fe (III) to Fe (II), the ultraviolet light irradiated glass thereby comprising 0.02 wt. % or more FeO in terms of $Fe_2O_3$. The glass to be irradiated comprises, in % by weight: 65 to 80% $SiO_2$, 0 to 5% $Al_2O_3$, 0 to 10% MgO, 5 to 15% CaO, 10 to 18% $Na_2O$, 0 to 5% $K_2O$, 5 to 15% MgO+CaO, 10 to 20% $Na_2O+K_2O$, and 0 to 5% $B_2O_3$; 0.02% or more total iron oxide (T-$Fe_2O_3$) in terms of $Fe_2O_3$, 0 to 2.0% $CeO_2$, 0 to 1.0% $TiO_2$, 0 to 0.005% CoO, and 0 to 0.005% Se.

9 Claims, No Drawings

METHOD FOR SHIFTING ABSORPTION PEAK WAVELENGTH OF INFRARED RADIATION ABSORBING GLASS

CROSS-REFERENCE TO THE RELATED APPLICATION

This application is a continuation-in-part application of application Ser. No. 08/864,984, filed May 29, 1997, entitled: INFRARED RADIATION ABSORBING GLASS, abandoned.

FIELD OF THE INVENTION

The present invention relates to a method for shifting the absorption peak wavelength of an infrared radiation absorbing glass. More particularly, the invention relates to a method for shifting the absorption peak wavelength in the wavelength range 900–1200 nm of an infrared radiation absorbing glass from less than 1100 nm to 1100 nm or longer without changing a visible light transmission of the glass.

BACKGROUND OF THE INVENTION

From the standpoint in reduction of the load of air conditioning in automobiles, a glass having infrared absorbing power has recently been proposed as window panes of automobiles.

For example, greenish blue-tinted glass having a relatively high $Fe_2O_3$ content to exhibit improved infrared absorbing power has been developed for use in automobiles. A typical example of such a greenish blue-tinted infrared absorbing glass has a composition comprising, in % by weight: 71% $SiO_2$, 1.5% $Al_2O_3$, 4% MgO, 8.6 t % CaO, 13.5% $Na_2O$, 0.7% $K_2O$, 0.55% total iron oxides in terms of $Fe_2O_3$, and 0.17 FeO in terms of $Fe_2O_3$. The glass having this composition with a thickness of 4 mm has a visible light transmission of 78% as measured with the CIE standard illuminant A and a solar energy transmission of 54%.

Glass having a bronze tint, on the other hand, contains $Fe_2O_3$ in an amount smaller than that in the greenish blue-tinted glass so as to have fair infrared absorbing power while maintaining visible light transmission. A typical example of infrared radiation absorbing glass having a bronze tint has a composition of, in % by weight: 72% of $SiO_2$, 1.5% $Al_2O_3$, 4% MgO, 8% CaO, 13.5% $Na_2O$, 0.7% $K_2O$, 0.24% total iron oxides in terms of $Fe_2O_3$, 0.054% of FeO in terms of $Fe_2O_3$, 0.001% CoO, and 0.001 wt % of Se. The glass having this composition with a thickness of 4 mm has a visible light transmission of 78% as measured with the CIE standard illuminant A and a solar energy transmission of 70%.

In the above-described conventional infrared radiation absorbing glass, its infrared absorbing power is imparted by $Fe^{2+}$ (FeO). However, if the FeO concentration in a greenish blue-tinted glass is increased in order to obtain higher infrared absorbing power, the absorption of FeO in the visible region increases, and as a result, there is particularly a problem that the visible light transmission required of windowpanes of vehicles cannot be obtained. In a glass which forms a color utilizing absorption of Se in the visible region, such as bronze type glass, there is the problem that greater restriction is imposed on the FeO concentration, and a high infrared absorbing power is not obtained.

SUMMARY OF THE INVENTION

The present invention has been made in view of the above-described problems involved in the prior art.

An object of the present invention is to provide a method for producing a glass having a high infrared absorbing power and a high visible light transmission.

According to one embodiment of the present invention, there is provided a method for shifting the absorption peak wavelength in the wavelength range 900–1600 nm of an infrared radiation absorbing glass from less than 1100 nm to 1100 nm or longer without substantially changing the tint of the glass, comprising the step of irradiating the glass which comprises, in % by weight:

65 to 80% $SiO_2$,
0 to 5% $Al_2O_3$,
0 to 10% MgO,
5 to 15% CaO,
10 to 18% $Na_2O$,
0 to 5% $K_2O$,
5 to 15% MgO+CaO,
10 to 20% $Na_2O+K_2O$, and
0 to 5% $B_2O_3$;
0.02% or more total iron oxide (T-$Fe_2O_3$) in terms of $Fe_2O_3$,
0 to 2.0% $CeO_2$,
0 to 1.0% $TiO_2$,
0 to 0.005% CoO, and
0 to 0.005% Se, with ultraviolet light of 400 nm or shorter at an energy density of $1.0 \times 10^6$ J/m²/hr pr more to increase the content of FeO in the irradiated glass by reducing Fe(III) to Fe(II), the ultraviolet light irradiated glass thereby comprising 0.02 wt. % or more FeO in terms of $Fe_2O_3$.

Preferably, the infrared radiation absorbing glass comprises, in % by weight:
0.05% or more T-$Fe_2O_3$ in terms of $Fe_2O_3$.

Preferably, the infrared radiation absorbing glass comprises, in % by weight:
0.05 to 1.0% T-$Fe_2O_3$ in terms of $Fe_2O_3$, and
0.02 to 0.5% FeO in terms of $Fe_2O_3$.

Preferably, the infrared radiation absorbing glass comprises, in % by weight:
0.02 to 0.6% T-$Fe_2O_3$ in terms of $Fe_2O_3$;
0.02 to 0.3 FeO in terms of $Fe_2O_3$;
0.2 to 2.0% $CeO_2$; and
0.0005 to 0.005% Se, wherein the relationship between the transmission at 1,050 nm ($T_{1050}$) and the transmission at 1,200 nm ($T_{1200}$) is $T_{1050} > T_{1200}$.

According to another embodiment of the present invention, there is provided a method for shifting the absorption peak wavelength in the wavelength range 900–1600 nm of an infrared radiation absorbing glass from less than 1100 nm to 1100 nm or longer without substantially changing the tint of the glass, comprising the step of irradiating the glass which comprises, in % by weight:

65 to 80% $SiO_2$,
0 to 5% $Al_2O_3$,
0 to 10% MgO, 5 to 15% CaO,
10 to 18% $Na_2O$,
0 to 5% $K_2O$,
5 to 15% MgO+CaO,
10 to 20% $Na_2O+K_2O$, and
0 to 5% $B_2O_3$;
0.05% or more total iron oxide (T-$Fe_2O_3$) in terms of $Fe_2O_3$,
0.5 to 3% total of one or more components selected from $CeO_2$, $Sb_2O_3$, $As_2O_3$, SnO and $Cu_2O$,
0 to 1.0% $TiO_2$,
0 to 0.005% CoO, and
0 to 0.005% Se,
with ultraviolet light of 400 nm or shorter at an energy density of $1.0 \times 10^6$ $J/m^2/hr$ or more to increase the content of FeO in the irradiated glass by reducing Fe(III) to Fe(II), the ultraviolet light irradiated glass thereby comprising 0.02 wt. % or more FeO in terms of $Fe_2O_3$.

The infrared radiation absorbing glasses according to the present invention preferably have a visible light transmission of 70% or more as measured with the CIE standard illuminant A and a total solar energy transmission of less than 70% as measured in the wavelength region of from 300 to 2,100 nm, when the thickness of the glass is 4 mm.

It is also preferred that the infrared radiation absorbing glasses according to the present invention have a dominant wavelength of 574 to 580 nm as measured with the CIE standard illuminant C and a total sunlight UV transmission of less than 12% as measured in a wavelength region of 297.5 to 377.5 nm according to ISO 9050, when the thickness of the glasses is 4 mm.

It is further preferred that the infrared radiation absorbing glasses according to the present invention have an ultraviolet transmission of less than 34% at a wavelength of 370 nm, when the thickness of the glasses is 4 mm.

DETAILED DESCRIPTION OF THE INVENTION

The reasons for limitation of the glass compositions of the infrared radiation absorbing glass used in the method according to the present invention are explained below. Hereinafter, unless otherwise indicated, all the percents are by weight.

Iron oxide is present in glass in the form of $Fe_2O_3$ ($Fe^{3+}$) and FeO ($Fe^{2+}$). $Fe_2O_3$ is a component serving to increase an infrared absorbing power, while FeO is a component serving to increase an ultraviolet absorbing power together with $CeO_2$ and $TiO_2$.

In general soda lime silica glass composition used as window glass of buildings and vehicles, $Fe^{2+}$ shows its absorption peak at about 1,050 nm and also has an absorption in the visible light region of from 400 to 780 nm. Therefore, if the FeO content is increased, the infrared absorbing power is increased, but a visible light transmission is simultaneously decreased. The gist of the present invention resides in shifting the absorption peak wavelength of $Fe^{2+}$ to a longer wavelength side to minimize the decrease in visible light transmission, thereby achieving both a high infrared absorbing power and a high visible light transmission at a time.

The absorption peak wavelength of $Fe^{2+}$ is shifted to the longer wavelength side by irradiating the glass with ultraviolet light at around room temperature.

The inventors of the present invention have found that ultraviolet irradiation of appropriate glass containing $Fe_2O_3$ under appropriate conditions easily results in formation of $Fe^{2+}$ having its absorption peak wavelength shifted to the longer wavelength side. Specifically, when glass containing a component acting as a photo-reducing agent, such as $Ce^{3+}$, and $Fe^{3+}$ is irradiated with UV at around room temperature, $Fe^{2+}$ is formed through the reaction: $Fe^{3+}+e^- \rightarrow Fe^{2+}$. While the absorption peak of $Fe_2+$ in a general soda lime silica glass composition for windows is at about 1050 nm, that of the $Fe^{2+}$ newly formed in glass on ultraviolet irradiation is shifted to the longer wavelength side, i.e., at about 1,200 nm or even more. This is because the thus formed $Fe^{2+}$ is surrounded by a distorted structure. The absorption peak of glass in an infrared region after ultraviolet irradiation is determined by the overlap between the absorption of the originally present $Fe^{2+}$ before irradiation and the absorption of the newly formed $Fe^{2+}$ after irradiation, and is usually at a wavelength of from 1,100 to 1,250 nm, although varying depending on the glass composition, ultraviolet irradiation conditions, and the like.

Ultraviolet irradiation is conducted using ultraviolet light of 400 nm or shorter at an energy density of $1.0 \times 10^6$ $J/m^2/hr$ or more.

Irradiation energy (a product of an irradiation energy density per unit time per unit area and an irradiation time) is preferably $7.0 \times 10^7$ to $5.0 \times 10^8$ $J/m^2$.

The shift of the absorption peak wavelength to the longer wavelength side can be evaluated by comparing the transmissions at the peak wavelength. In the present invention, the shift is expressed in terms of change in the wavelength at which the transmission has the minimum value in the range of from 900 to 1,600 nm ($\lambda_p$) or in terms of the comparison between the transmission at 1,050 nm ($T_{1050}$) and the transmission at 1,200 nm ($T_{1200}$). $\lambda_p$ is obtained, for example, as the minimum value of a transmission curve obtained by subjecting general smoothing treatment to the transmission data measured for each 2 nm or smaller.

If the total iron oxide (T-$Fe_2O_3$) content is too small, the infrared absorption power and ultraviolet absorbing power are decreased. If it is too, large, the visible light transmission is decreased. Accordingly, the T-$Fe_2O_3$ content should be 0.02% or more, and preferably from 0.05 to 1.0%. In the glass composition containing Se, for the formation of a bronze tint, the T-$Fe_2O_3$ content is preferably 0.2 to 0.6%.

If the FeO content is too small, the infrared absorbing power is decreased, and if it is too large, a visible light transmission is decreased. Accordingly, the FeO content should be 0.02% or more, and preferably from 0.02 to 0.5%, in terms of $Fe_2O_3$. In the glass composition containing Se, for the formation of a bronze tint, the FeO content preferably is from 0.02 to 0.3%.

$CeO_2$ is a component for enhancing ultraviolet absorption. It exists in glass in the form of $Ce^{3+}$ or $Ce^{4+}$. While $Ce^{3+}$ shows weak absorption in the visible region and is more effective for UV absorption, it is an important component for its function as a photo-reducing agent in the present invention. Specifically, when glass containing $Ce^{3+}$ is irradiated with ultraviolet light at around room temperature, $Ce^{3+}$ acts as a photo-reducing agent, emitting an electron through the reaction: $Ce^{3+} \rightarrow Ce^{4+} + e^-$. The thus emitted electron functions in the reaction: $Fe^{3+} + e^- \rightarrow Fe^{2+}$, in which $Fe_2O_3$ is reduced to form FeO. As described above, the thus formed FeO has its infrared absorption peak at a wavelength of about 1,200 nm or longer, which is a wavelength shifted to the long wavelength side as compared with about 1,050 nm of the FeO formed by a melt method in the production of general soda lime silica glass for windows. As a result, the glass after ultraviolet irradiation has an absorption peak in the infrared region at a wavelength of from about 1,100 to 1,250 nm, and thus can exhibit improved infrared absorbing power while minimizing the decrease in visible light transmission. The $CeO_2$ content should be 2.0% or less. If the $CeO_2$ content is too large, the absorption in the short wavelength side in the visible region is so large that the resulting glass assumes a yellow tint. To ensure a satisfactory function as a photo-reducing agent and to obtain an ultraviolet absorbing power, the $CeO_2$ content is preferably 0.05 to 2.0%, more preferably 0.2 to 2.0%, and most preferably more than 0.5 to 2.0%.

$SiO_2$ is a main component for forming a network structure of the glass. If the $SiO_2$ content is less than 65%, the glass has a reduced durability. If it exceeds 80%, it is difficult to melt the glass composition.

$Al_2O_3$ serves to improve durability of glass. If the $Al_2O_3$ content exceeds 5%, it is difficult to melt the glass of the composition. A preferred $Al_2O_3$ content is 0.1 to 2%.

MgO and CaO both serve to improve durability of glass and also to control the liquidus temperature and viscosity in forming the glass. If the MgO content exceeds 10%, the liquidus temperature rises. If the CaO content is less than 5% or higher than 15%, the liquidus temperature rises. If the total content of MgO and CaO is less than 5%, the resulting glass has reduced durability. If the total content exceeds 15%, the liquidus temperature rises.

$Na_2O$ and $K_2O$ are used as a glass melting accelerator. If the $Na_2O$ content is less than 10%, or if the total content of $Na_2O$ and $K_2O$ is less than 10%, the effect of melting acceleration is weak. If $Na_2O$ content exceeds 18%, or if the total content of $Na_2O$ and $K_2O$ exceeds 20%, durability of glass is decreased. $K_2O$ is effective to enhance the pink color development of Se and simultaneously to increase the ultraviolet absorbing power. It is unfavorable for the $K_2O$ content to exceed 5% because it is more expensive than $Na_2O$.

While $B_2O_3$ is a component used for the improvement of durability of glass and also as a melting aid, it also functions to enhance ultraviolet absorption. If the $B_2O_3$ content exceeds 5.0%, decrease in the light transmission in the ultraviolet region is also extended to the visible region, and the glass tends to assume a yellow tint. Moreover, disadvantages occur due to vaporization of $B_2O_3$ in forming glass. Accordingly, the upper limit of the $B_2O_3$ content should be 5.0%.

$TiO_2$ is a component for increasing ultraviolet absorbing power through the mutual action especially with FeO. If the $TiO_2$ content exceeds 1.0%, the glass assumes a yellow tint.

CoO is a component which develops a bronze color in the presence of Se. If the CoO content exceeds 0.005%, the visible light transmission is reduced.

Se develops a pink tint to thereby provide a bronze tint coupled with CoO which has a complementary color to the pink tint. If the Se content is less than 0.0005%, a desired color cannot be obtained. If it exceeds 0.005%, the visible light transmission is reduced.

$Sb_2O_3$, $As_2O_3$, SnO, and $Cu_2O$ function as a photo-reducing agent similar to $CeO_2$ or serve to accelerate the reducing action of $CeO_2$. If the total content of any one or more of these 5 components (inclusive of $CeO_2$) is less than 0.05%, the photo-reducing effect is small. The upper limit of the total content of the 5 components is 3% because of their expensiveness.

So long as the effect as aimed at in each embodiment of the present invention is not impaired, the glass composition according to the present invention may further contain one or more of ZnO, $Bi_2O_3$, NiO, MnO, and $MoO_3$ in a total amount of up to 1%; one or more of F, Cl, and Br in a total amount of up to 1%; and up to 1% of S in terms of $SO_3$.

The glass composition according to the present invention does not substantially contain $V_2O_5$, except that $V_2O_5$ is contained as an unavoidable impurity resulted from starting materials of glass.

The present invention is described in greater detail below by reference to the following Examples, but it should be understood that the invention is not construed as being limited thereto.

EXAMPLES 1 TO 5

And Comparative Examples 1 to 4

Siliceous sand, dolomite, limestone, soda ash, potassium carbonate, boron oxide, borax, ferric oxide, titanium oxide, cerium oxide, cobalt oxide, sodium selenite, and a carbonaceous material as a reducing agent were compounded at an appropriate ratio so as to obtain a prescribed glass composition. The resulting blend was melted at 1,500° C. for 4 hours in an electric furnace, and the molten glass was cast on a stainless steel plate and gradually cooled to room temperature to obtain a glass plate having a thickness of about 6 mm. This glass plate was polished to a thickness of 4 mm to prepare a glass sample.

A visible light transmission (YA) measured with the CIE standard illuminant A, a total solar energy transmission (TG), an ultraviolet transmission ($T_{uv}$) specified by ISO 9050, and a dominant wavelength (Dw) and an excitation purity (Pe) measured with the CIE standard illuminant C of the resulting glass sample were obtained. As an additional measure for ultraviolet transmission, an ultraviolet transmission at 370 nm ($T_{370}$), at which the change in transmission sensitively appears in the course of the steep rise from the absorption end of the transmission curve, was also measured.

The sample was then irradiated with ultraviolet light of 400 nm or shorter using a sunshine carbon arc lamp at an energy density of $1.43 \times 10^6$ J/m²/hr for a prescribed irradiation time to give a prescribed UV energy Q (J/m²), a product of the energy density and an irradiation time. After the ultraviolet irradiation, the above-described optical properties were measured again. The change in absorption peak wavelength of FeO due to ultraviolet irradiation was evaluated from the transmissions at 1,050 nm and 1,200 nm ($T_{1050}$, $T_{1200}$) and the wavelength at which the transmission has the minimum value in the range of from 900 to 1,600 nm ($\lambda_p$).

The concentrations of each component and optical properties of the ultraviolet irradiated samples and the ultraviolet irradiation energy (Examples 1 to 5) are shown in Table 1 below.

The concentrations of each component and optical properties of the samples before ultraviolet irradiation (Comparative Examples 1 to 4) are shown in Table 2 below. Comparative Example 1 corresponds to Example 1; Comparative Example 2 to Example 2; Comparative Example 3 to Examples 3 and 4; and Comparative Example 4 to Example 5.

All the concentrations shown in the Tables are expressed in % by weight.

TABLE 1

|  | Example 1 | Example 2 | Example 3 | Example 4 | Example 5 |
|---|---|---|---|---|---|
| Composition (wt %): | | | | | |
| $SiO_2$ | 71.3 | 70.5 | 70.5 | 70.5 | 70.5 |
| $B_2O_3$ | 0 | 1.0 | 0 | 0 | 0 |
| $Al_2O_3$ | 1.6 | 1.5 | 1.5 | 1.5 | 1.5 |
| MgO | 3.64 | 4.0 | 4.0 | 4.0 | 3.46 |
| CaO | 7.8 | 8.0 | 8.0 | 8.0 | 8.0 |
| $Na_2O$ | 12.5 | 13.0 | 13.0 | 13.0 | 13.0 |
| $K_2O$ | 0.6 | 0.7 | 0.7 | 0.7 | 1.3 |
| $CeO_2$ | 1.6 | 1.55 | 1.75 | 1.75 | 1.7 |
| $TiO_2$ | 0.33 | 0.03 | 0.23 | 0.23 | 0.10 |
| CoO | 0 | 0 | 0.0011 | 0.0011 | 0.0017 |
| SeO | 0 | 0 | 0.0011 | 0.0011 | 0.0011 |
| $T\text{-}Fe_2O_3$ | 0.63 | 0.7 | 0.35 | 0.35 | 0.42 |
| FeO | 0.24 | 0.23 | 0.071 | 0.079 | 0.078 |
| Optical Properties: | | | | | |
| YA (%) | 70.0 | 70.1 | 72.5 | 72.0 | 71.8 |
| TG (%) | 40.6 | 42.3 | 65.6 | 61.6 | 61.8 |
| Dw (nm) | 527 | 525 | 577 | 577 | 576 |
| Pe (%) | 2.9 | 2.5 | 7.6 | 7.7 | 7.6 |
| $T_{UV}$ (%) | 6.7 | 7.2 | 8.9 | 7.8 | 6.9 |
| $T_{370}$ (%) | 19.1 | 21.1 | 25.2 | 22.0 | 19.5 |
| $T_{1050}$ (%) | 12.8 | 14.7 | 58.1 | 48.6 | 49.5 |
| $T_{1200}$ (%) | 13.1 | 14.8 | 57.3 | 46.9 | 47.3 |
| $\lambda_p$ (nm) | 1110 | 1110 | 1105 | 1210 | 1220 |
| Q (J/m$^2$) | $1.5 \times 10^8$ | $1.5 \times 10^8$ | $7.0 \times 10^6$ | $3.6 \times 10^7$ | $2.0 \times 10^8$ |

TABLE 2

|  | Comparative Example 1 | Comparative Example 2 | Comparative Example 3 | Comparative Example 4 |
|---|---|---|---|---|
| Composition (wt %): | | | | |
| $SiO_2$ | 71.3 | 70.5 | 70.5 | 70.5 |
| $B_2O_3$ | 0 | 1.0 | 0 | 0 |
| $Al_2O_3$ | 1.6 | 1.5 | 1.5 | 1.5 |
| MgO | 3.64 | 4.0 | 4.0 | 3.46 |
| CaO | 7.8 | 8.0 | 8.0 | 8.0 |
| $Na_2O$ | 12.5 | 13.0 | 13.0 | 13.0 |
| $K_2O$ | 0.6 | 0.7 | 0.7 | 1.3 |
| $CeO_2$ | 1.6 | 1.55 | 1.75 | 1.7 |
| $TiO_2$ | 0.33 | 0.03 | 0.23 | 0.10 |
| CoO | 0 | 0 | 0.0011 | 0.0017 |
| SeO | 0 | 0 | 0.0011 | 0.0011 |
| $T\text{-}Fe_2O_3$ | 0.63 | 0.7 | 0.35 | 0.42 |
| FeO | 0.17 | 0.18 | 0.054 | 0.045 |
| Optical Properties: | | | | |
| YA (%) | 73.0 | 71.8 | 72.8 | 73.0 |
| TG (%) | 45.2 | 44.7 | 66.9 | 68.9 |
| Dw (nm) | 534 | 524 | 578 | 578 |
| Pe (%) | 3.1 | 2.5 | 7.6 | 8.2 |
| $T_{UV}$ (%) | 7.7 | 8.1 | 9.2 | 8.6 |
| $T_{370}$ (%) | 22.5 | 24.0 | 26.1 | 25.1 |
| $T_{1050}$ (%) | 17.9 | 17.3 | 60.1 | 64.8 |
| $T_{1200}$ (%) | 19.2 | 18.4 | 60.7 | 65.9 |
| $\lambda_p$ (nm) | 1050 | 1050 | 1050 | 1050 |

As is apparent from the results in Tables 1 and 2 above, every sample according to the present invention has an absorption peak wavelength ($\lambda_p$) of FeO shifted to the long wavelength side as compared with the corresponding comparative sample. As a result, the proportion of the FeO's absorption reaching to the visible light region is decreased, and the decrease in visible light transmission (YA) is smaller than the decrease in total solar energy transmission (TG) due to ultraviolet irradiation. It is thus understood that the glass exhibiting a visible light transmission comparable to and an infrared absorbing power higher than those of the non-irradiated glass.

The infrared radiation absorbing glass according to the present invention has an infrared absorption peak at a wavelength of 1,100 nm or longer and therefore exhibits excellent infrared absorbing power and a high visible light transmission.

Further, due to such high infrared absorption power and visible light transmission, the infrared radiation absorbing glass of the present invention is excellent in reducing the load of air conditioning while securing a comfortable visual field when applied to windows of vehicles, e.g., automobiles, or buildings.

While the invention has been described in detail and with reference to specific examples thereof, it will be apparent to one skilled in the art that various changes and modifications can be made therein without departing from the spirit and scope thereof.

What is claimed is:

1. A method for shifting the absorption peak wavelength in the wavelength range 900–1600 nm of an infrared radiation absorbing glass from less than 1100 nm to 1100 nm or longer without substantially changing the tint of the glass, comprising the step of irradiating the glass which comprises, in % by weight:

65 to 80% $SiO_2$,
0 to 5% $Al_2O_3$,
0 to 10% MgO,
5 to 15% CaO,
10 to 18% $Na_2O$,
0 to 5% $K_2O$,
5 to 15% Mgo+CaO,
10 to 20% $Na_2O+K_2O$, and
0 to 5% $B_2O_3$;
0.02% or more total iron oxide (T-$Fe_2O_3$) in terms of $Fe_2O_3$,
0 to 2.0% $CeO_2$,
0 to 1.0% $TiO_2$,
0 to 0.005% CoO, and
0 to 0.005% Se,
with ultraviolet light of 400 nm or shorter at an energy density of $1.0 \times 10^6$ J/m$^2$/hr or more to increase the content of FeO in the irradiated glass by reducing Fe(III) to Fe(II), the ultraviolet light irradiated glass thereby comprising 0.02 wt. % or more FeO in terms of $Fe_2O_3$.

2. The method as claimed in claim 1, wherein the infrared radiation absorbing glass comprises, in % by weight:

0.05% or more T-$Fe_2O_3$ in terms of $Fe_2O_3$.

3. The method as claimed in claim 1, wherein the infrared radiation absorbing glass comprises, in % by weight:

0.05 to 1.0% T-$Fe_2O_3$ in terms of $Fe_2O_3$, and 0.02 to 0.5% FeO in terms of $Fe_2O_3$.

4. The method as claimed in claim 1, wherein the infrared radiation absorbing glass comprises, in % by weight:

0.02 to 0.6% T-$Fe_2O_3$ in terms of $Fe_2O_3$;

0.02 to 0.3 FeO in terms of $Fe_2O_3$;

0.2 to 2.0% $CeO_2$; and 0.0005 to 0.005% Se, wherein the relationship between the transmission at 1,050 nm ($T_{1050}$) and the transmission at 1,200 nm ($T_{1200}$) is $T_{1050}>T_{1200}$.

5. The method as claim in claim 1, wherein the content of $CeO_2$ is more than 0.5 to 2.0% by weight.

6. The method as claimed in claim 1, wherein the ultraviolet irradiation is conducted with irradiation energy of $7.0\times10^7$ to $5.0\times10^8$ $J/m^2$.

7. A method for shifting the absorption peak wavelength in the wavelength range 900–1600 nm of an infrared radiation absorbing glass from less than 1100 nm to 1100 nm or longer without substantially changing the tint of the glass, comprising the step of irradiating the glass which comprises, in % by weight:

65 to 80% $SiO_2$, 0 to 5% $Al_2O_3$, 0 to 10% MgO, 5 to 15% CaO, 10 to 18% $Na_2O$, 0 to 5% $K_2O$, 5 to 15% MgO+CaO, 10 to 20% $Na_2O+K_2O$, and 0 to 5% $B_2O_3$;

0.05% or more total iron oxide (T-$Fe_2O_3$) in terms of $Fe_2O_3$, 0.5 to 3% total of one or more components selected from $CeO_2$, $Sb_2O_3$, $As_2O_3$, SnO and $Cu_2O$, 0 to 1.0% $TiO_2$, 0 to 0.005% CoO, and 0 to 0.005% Se, with ultraviolet light of 400 nm or shorter at an energy density of $1.0\times10^6$ $J/m^2$/hr or more to increase the content of FeO in the irradiated glass by reducing Fe(III) to Fe(II), the ultraviolet light irradiated glass thereby comprising 0.02 wt. % or more FeO in terms of $Fe_2O_3$.

8. The method as claim in claim 7, wherein the content of $CeO_2$ is more than 0.5 to 2.0% by weight.

9. The method as claimed in claim 7, wherein the ultraviolet irradiation is conducted with irradiation energy of $7.0\times10^7$ to $5.0\times10^8$ $J/m^2$.

* * * * *